United States Patent
Tso et al.

(10) Patent No.: US 6,421,733 B1
(45) Date of Patent: *Jul. 16, 2002

(54) SYSTEM FOR DYNAMICALLY TRANSCODING DATA TRANSMITTED BETWEEN COMPUTERS

(75) Inventors: Michael Man-Hak Tso, Hillsboro; Thomas G. Willis, Portland; John W. Richardson, Portland; Robert Conrad Knauerhase, Portland; Damien Macielinski, Portland, all of OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/925,276

(22) Filed: Sep. 8, 1997

Related U.S. Application Data

(60) Provisional application No. 60/041,366, filed on Mar. 25, 1997.

(51) Int. Cl.[7] .............................................. G06F 15/16
(52) U.S. Cl. ........................ 709/246; 709/217; 358/402
(58) Field of Search ....................... 395/200.47, 200.48, 395/200.49, 200.36, 200.59, 200.43, 186, 800; 707/1, 2, 6, 9, 13; 380/3, 25; 364/514; 356/402; 705/26; 709/217, 231, 204, 210–219, 240–249, 1, 226, 202, 224; 713/201; 348/722; 379/201; 358/402

(56) References Cited

U.S. PATENT DOCUMENTS

| | | | |
|---|---|---|---|
| 5,347,578 A | * 9/1994 | Duxbury | 709/79 |
| 5,373,375 A | 12/1994 | Weldy | 358/523 |
| 5,461,488 A | * 10/1995 | Witek | 358/402 |
| 5,483,658 A | * 1/1996 | Grube et al. | 395/800 |
| 5,517,612 A | 5/1996 | Dwin et al. | 395/166 |
| 5,543,920 A | * 8/1996 | Collins et al. | 356/402 |
| 5,544,320 A | 8/1996 | Konrad | 395/200.09 |
| 5,555,192 A | * 9/1996 | Grube et al. | 364/514 |
| 5,568,550 A | * 10/1996 | Ur | 380/3 |
| 5,608,800 A | * 3/1997 | Hoffmann et al. | 380/25 |
| 5,673,322 A | 9/1997 | Pepe et al. | 380/49 |
| 5,684,969 A | 11/1997 | Ishida | 395/342 |
| 5,694,334 A | * 12/1997 | Donahue et al. | 709/247 |
| 5,701,451 A | 12/1997 | Rogers et al. | 395/600 |
| 5,706,434 A | 1/1998 | Kremen et al. | 395/200.09 |
| 5,724,556 A | 3/1998 | Souder et al. | 395/500 |
| 5,727,159 A | 3/1998 | Kikinis | 395/200.76 |
| 5,742,905 A | 4/1998 | Pepe et al. | 455/461 |
| 5,745,678 A | * 4/1998 | Herzberg et al. | 713/200 |
| 5,754,763 A | * 5/1998 | Bereiter | 713/201 |
| 5,764,235 A | 6/1998 | Hunt et al. | 345/428 |
| 5,768,510 A | 6/1998 | Gish | 395/200.33 |
| 5,805,735 A | 9/1998 | Chen et al. | 382/239 |
| 5,826,025 A | * 10/1998 | Gramlich | 395/200.47 |

(List continued on next page.)

OTHER PUBLICATIONS

Safranek et al, Method for Matching Compresses Video to ATM Networks, IEEE 1995.*

Assuncao et al, Congestion Control of Video Traffic with Transcoders, IEEE 1997.*

(List continued on next page.)

Primary Examiner—Mark H. Rinehart
Assistant Examiner—Thong Vu
(74) Attorney, Agent, or Firm—Kenyon & Kenyon

(57) ABSTRACT

A system for dynamically transcoding data transmitted between computers is implemented in an apparatus for use in transmitting data between a network server and a network client over a communications link. The apparatus includes a parser coupled to a transcode service provider. The parser is configured to selectively invoke the transcode service provider in response to a predetermined selection criterion.

4 Claims, 9 Drawing Sheets

U.S. PATENT DOCUMENTS

| | | | | |
|---|---|---|---|---|
| 5,832,208 A | * | 11/1998 | Chen et al. | 713/201 |
| 5,835,087 A | * | 11/1998 | Herz et al. | 345/327 |
| 5,835,718 A | * | 11/1998 | Blewett | 395/200.48 |
| 5,835,896 A | * | 11/1998 | Fisher et al. | 705/37 |
| 5,838,916 A | * | 11/1998 | Domenikos et al. | 395/200.49 |
| 5,848,413 A | * | 12/1998 | Wolff | 707/10 |
| 5,850,433 A | * | 12/1998 | Rondeau | 379/201 |
| 5,862,325 A | * | 1/1999 | Reed et al. | 395/200.31 |
| 5,870,543 A | * | 2/1999 | Ronning | 395/186 |
| 5,880,792 A | * | 3/1999 | Ward et al. | 348/722 |
| 5,889,943 A | * | 3/1999 | Ji et al. | 713/201 |
| 5,897,622 A | * | 4/1999 | Blinn et al. | 705/26 |
| 5,909,683 A | * | 6/1999 | Miginiac et al. | 707/13 |
| 5,918,013 A | * | 6/1999 | Mighdoll et al. | 709/217 |
| 5,983,004 A | * | 11/1999 | Shaw et al. | 709/247 |
| 5,996,022 A | * | 11/1999 | Krueger et al. | 709/247 |
| 6,151,618 A | * | 11/2000 | Wahbe et al. | 709/1 |
| 6,158,903 A | * | 12/2000 | Schaeffer et al. | 709/204 |
| 6,161,137 A | * | 12/2000 | Ogdon et al. | 709/224 |
| 6,185,625 B1 | * | 2/2001 | Tso et al. | 709/247 |

OTHER PUBLICATIONS

PC Virus Alert, http://byu.edu/csr/www/solutions/handouts/pevirus.html 1995.*

Drejhammar. Computer Viruses, Trojans and Logical Boms, http://www.student.nada.kth.se/~d95-fdr/compvir.html. 1996.*

Protecting Electronic Health Information. http://www.nap.edu./readingroom/books/ftr52fe.html 3/97.*

Fox et al, Reducing WWW latency and Bandwidth Requirements by Real Time Distillation 5/1996.*

Wu et al, An Efficient JPEG to MPEG–1 Transcoding Algorithm. IEEE 6/1996.*

Fox, Gribble, Chawathe and Brewer, Adapting to network and client variation using infrastructural proxies; lessons and perspectives, IEEE Personal Communications, vol. 5, Iss. 4, Aug. 1998, pp. 10–19.*

Zenel and Duchamp, "General purpose proxies: solved and unsolved problems," Sixth Workshop on Hot Topics in Operating Systems, May 1997, pp. 87–92.*

Fox et al., "Adapting to Network and Client Variability via On–Demand Dynamic Distillation," U of C at Berkeley, 9/1996.*

Armando Fox and Eric A. Brewer, "Reducing WWW Latency and Bandwidth Requirements by Real–Time Distillation," Fifth International World Wide Web Conference, May 6–10, 1996.

Armando Fox et al., Adapting to Network and Client Variability via On–Demand Dynamic Distillation, University of Cal. at Berkeley, Sep. 1996.

* cited by examiner

SYSTEM FOR DYNAMICALLY TRANSCODING DATA TRANSMITTED BETWEEN COMPUTERS

This application claims the benefit of U.S. Provisional Application No. 60/041,366, filed Mar. 25, 1997.

BACKGROUND OF THE INVENTION

1. Field of the Invention

The present invention relates generally to the field of data communications for personal computers (PCs), and in particular to a system for dynamically transcoding data transmitted between two computers over a communications link.

2. Related Art

The Internet is quickly becoming the preferred data communications medium for a broad class of computer users ranging from private individuals to large multi-national corporations. Such users now routinely employ the Internet to access information, distribute information, correspond electronically, and even conduct personal conferencing. An ever-growing number of individuals, organizations and businesses have established a presence on the Internet through "web pages" on the World-Wide Web (WWW).

For a wide variety of reasons, it may be desirable to manipulate data transmitted between a local client computer and a network server computer. For example, in certain instances it may be advantageous to dynamically add, modify or delete content retrieved from an Internet server computer before that content is provided to a client computer. Conversely, it may be advantageous to modify a content request from a client computer prior to transmitting the request to an Internet server computer. While such dynamic manipulation of requests and responses is desirable, it is impractical to expect the expansive Internet infrastructure to quickly change to accommodate such a new capability. For this reason, it is desirable to implement such new capabilities in a way that does not require changes to either existing client computers or Internet server computers.

It is known to deploy a proxy server, or network proxy, as an intermediary between one or more client computers and an external network such as the Internet. Network proxies are described generally in Ian S. Graham, *HTML Source Book: A Complete Guide to HTML* 3.0 403 (2d ed. 1996). One common application for a proxy server is as a so-called "firewall," wherein the proxy server is responsible for all communications with the outside world. In other words, local devices are not permitted to communicate directly with external network computers, such as Internet servers. Instead, each local device directs requests for networkresident data to the proxy server. When the proxy server receives such a request, it forwards the request to the appropriate external computer, receives the response from the external computer, and then forwards the response to the local device. The external computer thus has no knowledge of the local devices. In this way, the local devices are protected from potential dangers such as unauthorized access.

Existing proxy servers do not manipulate the data passing through them. In essence, proxy servers are merely blind conduits for requests and responses. This limitation of existing proxy servers restricts these devices from being used to full advantage when facilitating communications between local devices and network devices. There is therefore a need for a so-called "smart" proxy capable of examining the data passing through it, whether it be a request intended for an external network device or network content being returned to a local device, and dynamically acting upon that data. Such a device can be used to transparently provide a wide range of services that were heretofore impossible without modifying existing Internet infrastructure.

SUMMARY OF THE INVENTION

Embodiments of the present invention relate to devices, systems and methods for transcoding information transmitted between computers, such as a network server computer and a network client computer.

According to one embodiment, an apparatus for use in transmitting data between a network server and a network client over a communications link includes a parser coupled to a transcode service provider. The parser is configured to selectively invoke the transcode service provider in response to a predetermined selection criterion.

DETAILED DESCRIPTION

Embodiments of the present invention provide the ability to dynamically transcode information transmitted between, for example, a network server computer and a network client computer. As used herein, the term "transcode" applies to virtually any manipulation of data including, but not limited to, adding, modifying or deleting data.

Figure 1:
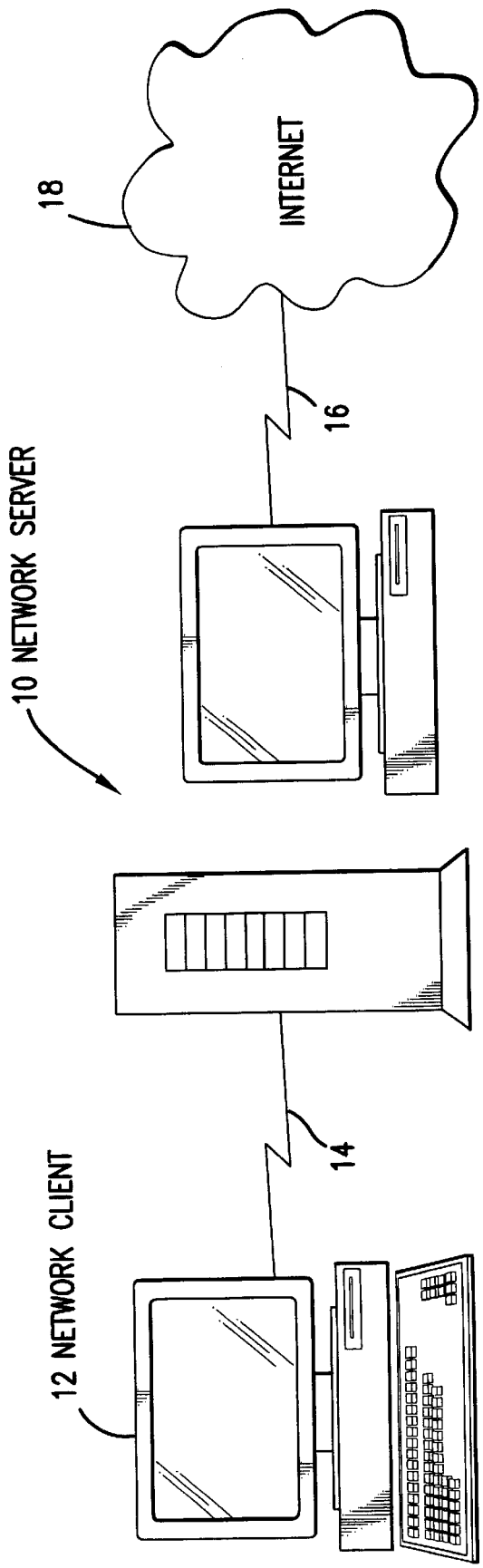
FIG. 1 is a schematic diagram illustrating an environment in which embodiments of the present invention may be applied.

Referring now to FIG. 1, which illustrates an environment in which embodiments of the present invention may be advantageously applied, a network server 10 manages the transfer of data from the Internet 18 to a network client 12. Network client 12 may be any computer having suitable data communications capability.

Network client 12 communicates requests for information to, and receives information from, network server 10 over a client/server communications link 14. Client/server communications link 14 may comprise, for example, a so-called "slow network" using, for example, POTS (Plain Old Telephone System) dial-up technology or wireless connections. Alternatively, client/server communications link 14 may comprise a so-called "fast network," such as a LAN or WAN (Wide Area Network), which is capable of operating at much higher speeds than are possible with slow networks. Combinations of these access methods are also possible. For example, network client 12 may use a POTS or wireless dial-up connection to a modem bank maintained by an ISP (Internet Service Provider), which is in turn connected to network server 10 over a LAN. Network server 10 communicates with computers resident on Internet 18 through server/network communications link 16, which may comprise any suitable communications medium known in the art.

Figure 2:
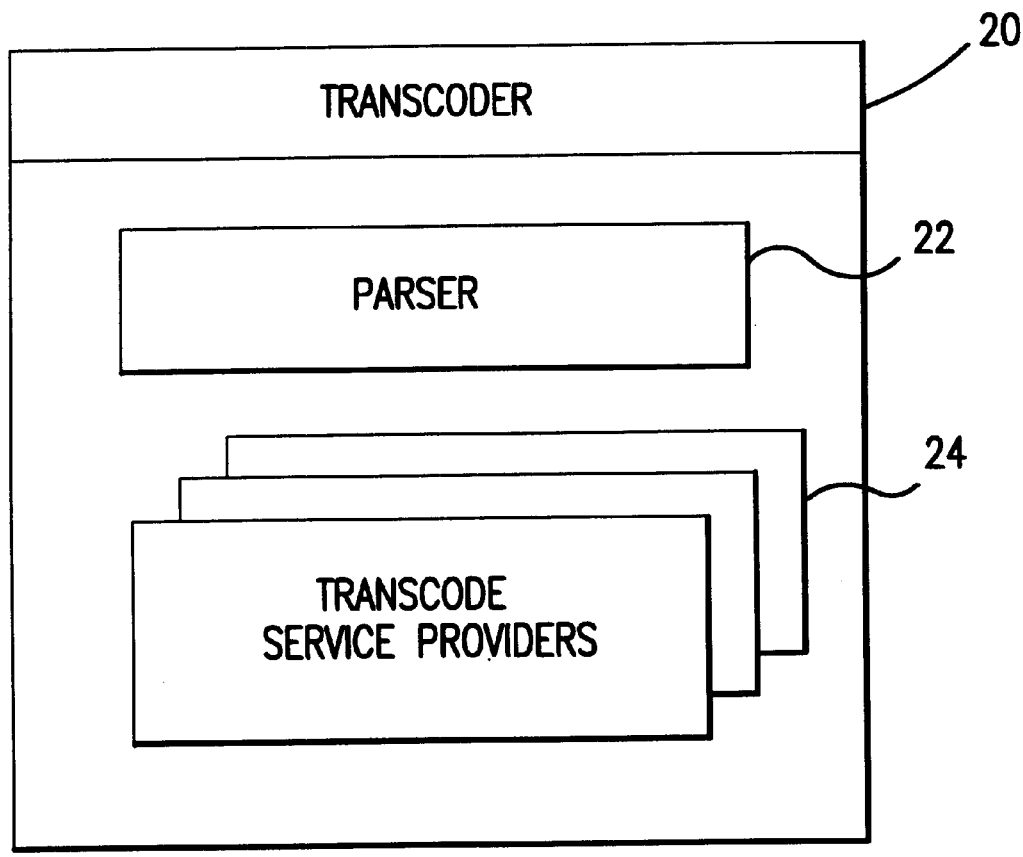
FIG. 2 is a schematic diagram illustrating a transcoder module according to an embodiment of the present invention.

According to a first general embodiment of the present invention, illustrated schematically in FIG. 2, a transcoder 20 includes a parser 22 and a plurality of transcode service providers 24. Parser 22 is configured to act upon data received by transcoder 20, such as a request for a network object generated by a client device or a reply to such a request provided by a content server device. In this particular embodiment, parser 22 is responsible for selectively invoking one or more of transcode service providers 24 based upon a predetermined selection criterion.

Transcoder 20 may be implemented, for example, as a software module installed in a network proxy, in a client device, in a network server device, or in a content server device. In one particular implementation, illustrated in FIG. 3, transcoder 20 is installed in a remote transcoding server 34 arranged between network client 12 and Internet 18. Transcoding server 34 may comprise, or be a part of, a network server, a stand-alone computer in communication with a network server, or a distributed system of computers. Remote transcoding server 34 may be coupled, for example, to an ISP's network, a corporate network, or anywhere on Internet 18, and may provide multiple users (i.e., clients) with a means to obtain content on Internet 18.

Figure 3:
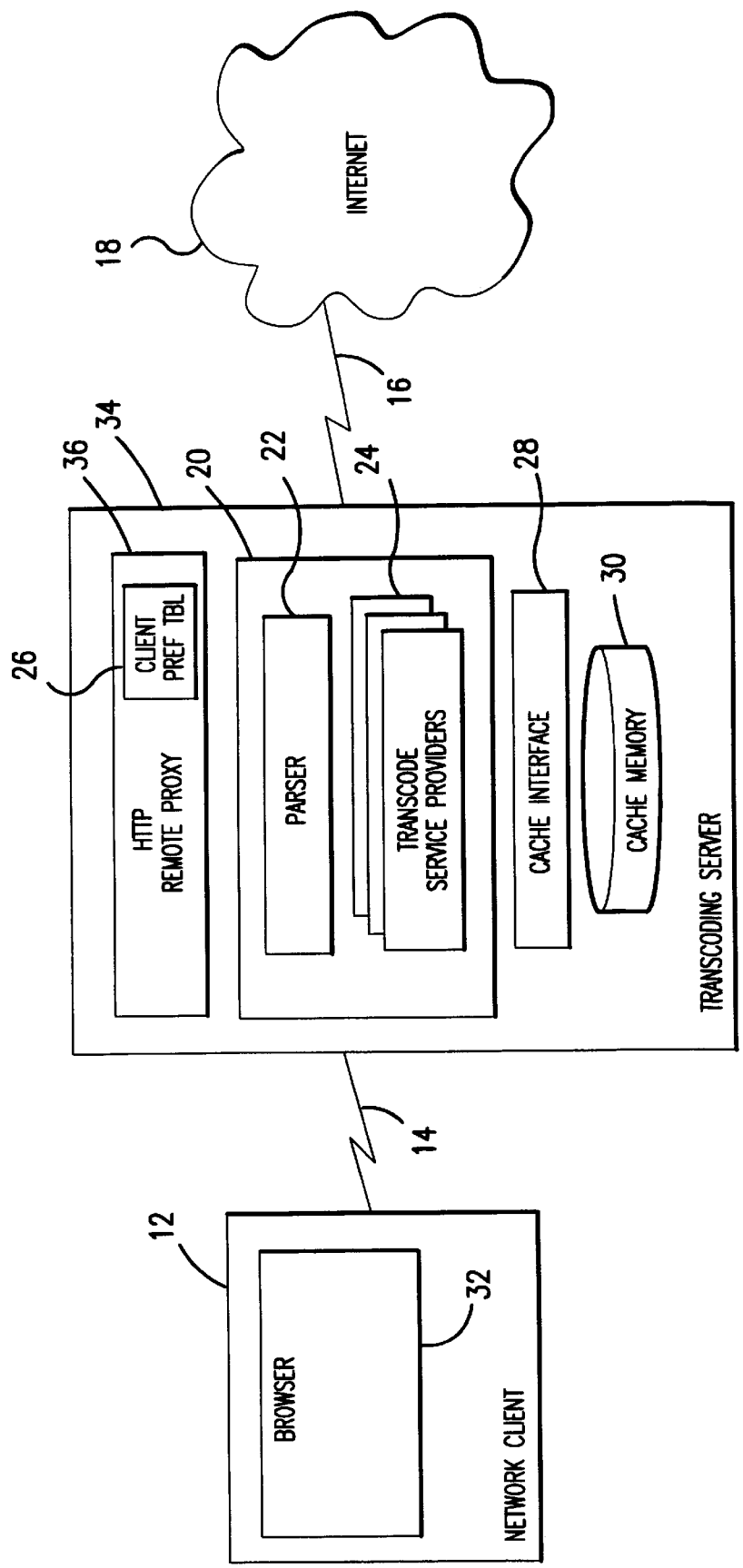
FIG. 3 is a schematic diagram illustrating an embodiment of the present invention for a non-enabled network client.

In the particular embodiment illustrated in FIG. 3, transcoding server 34 includes an HTTP (HyperText Transfer Protocol) remote proxy 36, capable of accessing Internet 18 over server/network communications link 16. HTTP remote proxy 36 differs from known network proxies, which generally are little more than a conduit for requests to, and replies from, external Internet resources, in that it is capable not only of examining such requests and replies, but also of acting upon commands in the requests by, for example, determining whether or not to transcode content. Moreover, using transcoder 20, HTTP remote proxy 36 is capable of changing content received from Internet 18 prior to returning it to a requesting network client 12, as is explained further below.

Looking more closely at the embodiment in FIG. 3, transcoder 20 is coupled to HTTP remote proxy 36. Parser 22 manages the transcoding of data to be transmitted from transcoding server 34 to network client 12. To this end, parser 22 controls transcode service providers 24 to selectively transcode content based on a predetermined selection criterion. For example, one or more transcode service providers 24 may provide the capability to compress and/or scale different types of data content, such as image, video, or HTML (HyperText Markup Language). Such uses are described further in co-pending U.S. patent applications Ser. No. 08/772,164 entitled "System for Enhancing Data Access Over a Communications Link," filed on Dec. 20, 1996, and Ser. No. 08/799,654 entitled "Method and Apparatus for Scaling Image Data," filed on Feb. 11, 1997, both of which are assigned to Intel Corporation. For purposes of illustrating certain features of the present invention, a number of embodiments are described below in terms of content scaling/compression; however, as is explained, transcode service providers 24 may provide a wide variety of transcoding functions.

As shown in FIG. 3, transcoding server 34 may also include a server-side cache memory 30 managed by a server-side cache interface 28. Server-side cache memory 30 may be used to store both original and transcoded versions of content for later transmission to network client 12 without the need to re-retrieve the content from Internet 18 or to re-transcode the content.

Transcoding server 34 is coupled to network client 12 by client/server communications link 14. Network client 12 includes a browser 32, such as the Netscape Navigator v.3.0 browser (although the invention is not limited in this respect), which manages the presentation of data to a user. In this embodiment, network client 12 is "non-enabled," meaning no specialized transcoding software is preloaded on network client 12.

Parser 22 may comprise a relatively simple, uniform interface to HTTP remote proxy 36, and may provide an API (Application Programming Interface) for transcoding data received by HTTP remote proxy 36. Parser 22 manages one or more transcode service providers 24 that are accessed through a common SPI (Service Provider Interface). In this particular embodiment, parser 22 is designed in compliance with the Windows Open Systems Architecture (WOSA), and may be implemented as a Win32 DLL (Dynamic Link Library). The WOSA architecture, described in *Readings on Microsoft Windows and WOSA* (Microsoft Corp. 1995), enables additional transcode service providers 24 to be dynamically added to the system to provide new features and/or better transcoding algorithms, while at the same time not requiring changing or retesting other software components in the system. This feature is especially beneficial where transcoding server 34 also interacts with "enabled" network clients equipped with specialized transcoding software. It should be noted that some of the features of parser 22 described below may be inapplicable to the non-enabled client embodiment of FIG. 3; however, transcoding server 34 may advantageously be configured flexibly enough to process requests from both non-enabled and enabled network clients.

Like parser 22, server-side cache interface 28 may be modeled after a standard Get/Set interface. Server-side cache memory 30 essentially "owns" all cached objects, in that it manages the properties and storage of the objects and may invalidate any non-locked object at any time; however, the actual format of any given cached object is known only by parser 22 and its associated transcode service providers 24. Thus, for data integrity and transcoding efficiency purposes, all access to server-side cache memory 30 in this embodiment is through parser 22.

Server-side cache interface 28 may include the following calls:
CreateEntry(URL, &Entry, . . . );
GetEntry(URL, &Entry);
CreateStream(Entry, &StreamEntry, . . . );
GetStream(Entry, &StreamEntry, . . . );
CloseEntry(Entry);
CloseStreamEntry(StreamEntry);
GetProperties(Entry, &Properties, . . . );
SetProperties(Entry, &Properties, . . . );
Read(StrearnEntry, &OutStream, . . . );
Write(StreamEntry, &InStream, . . . ).
Unlike most cache memories, server-side cache interface 28 and server-side cache memory 30 enable maintenance of multiple representations of a given cached object, with descriptive information about each representation included in server-side cache memory 30. In addition, server-side cache interface 28 and server-side cache memory 30 serve as a synchronization point for multi-threaded accesses to cached objects. It should be noted that the illustrated embodiment does not require any particular configuration for server-side cache interface 28 and/or server-side cache memory 30. Indeed, functionality attributed to these components in the various embodiments described herein may be readily implemented in other system components.

The CreateEntry ( ) call creates and returns a cache entry for a specified hypertext object. This call also creates an entry stream for an original version of the hypertext object. Similarly, the GetEntry ( ) call obtains a cache entry for a hypertext object already existing in cache memory 30. Both the CreateEntry ( ) and GetEntry ( ) calls set locks on associated cached objects until a CloseEntry ( ) call is invoked. Once a lock is set, the cached object will not be replaced or invalidated by cache interface 28, permitting one or more transcode service providers 24 to safely perform any required cache operations, such as object retrieval and/or storage.

After a cache entry is created or opened by a CreateEntry ( ) or GetEntry ( ) call, the CreateStream ( ) or GetStream ( ) calls may respectively create or open an extra stream entry for the cached object. Each extra stream entry is associated with a different transcoded version of the hypertext object, which may be retrieved or appended to by one of transcode service providers 24. Stream-based processing of cached objects makes it possible for transcoding server 34 to begin transmitting a transcoded version of a hypertext object to a requesting network client 12 even while transcode service provider 24 is appending additional transcoded content to that same version. Advantages of this stream-based processing include reducing user latency through incremental painting of objects and avoiding unnecessary idle time on client/server communications link 14, thereby providing users with a more responsive "feel."

The GetProperties ( ) and SetProperties ( ) calls retrieve and store information about cached objects, including information maintained by transcode service provider 24 used to determine transcoding properties and transcoding status of a cached object. Transcode service provider 24 may use such information, for example, to determine current compression progress for scaled data access and staged refinements.

The Read ( ) call reads data from a specified cached object data stream. For example, transcode service provider 24 may invoke this call and tunnel stream data through HTTP remote proxy 36 directly to network client 12. The Write ( ) call caches data from a new HTTP data stream. This call will append an incoming data stream received from, for example, a Web server or transcode service provider 24, to an opened cache stream which may be concurrently read using the Read ( ) call.

In the present embodiment, parser 22 includes the following calls:

GetObject(URL, InParams, &OutParams, &OutStream, . . . );
GetScaledObject(URL, InParams, &OutParams, &OutStream, Stage,
PutObject(URL, InParamStruct, &InStream, &OutParams, &OutStream, . . . ).

As detailed below, parser 22 uses these calls to manage the provision of requested content to network client 12.

The GetObject ( ) call is used to service non-enabled client requests, and returns a non-transcoded (i.e., original) version of a specified hypertext object. In this embodiment, transcoding server 34 assumes that each HTTP request has a unique thread that may be blocked until the request is satisfied. Accordingly, the GetObject ( ) call will block until it either returns the requested data stream or indicates failure with a cause (e.g., object does not exist). This ability to return a so-called standard hypertext object is advantageous for compatibility reasons, enabling embodiments of the present invention to be used with existing browsers that do not include support for certain transcoding functionality (e.g., advanced data compression), and enabling users to selectively retrieve non-transcoded versions.

The GetScaledObject ( ) call is similar to GetObject ( ), and is also used to request an object from server-side cache memory 30; however, it adds support for requesting a particular version of that object, such as a high-quality rendition. Unlike traditional caching proxies, transcode service providers 24 can use server-side cache memory 30 to store several different versions of an object to support clients with different communications and/or presentation capabilities. Thus, an additional "Stage" parameter may be used to indicate which version of the cached object is to be returned to network client 12. Where transcode service provider 24 is configured to scale network content, it may use this parameter to request a version of a cached object having, for example, a default scaled quality, a refinement to a better-quality version, or the original non-scaled version.

In this embodiment, when network client 12 requests a hypertext object, HTTP remote proxy 36 uses either the GetObject ( ) or GetScaledObject ( ) call (depending on if network client 12 is capable of receiving scaled/transcoded datatypes) to retrieve the hypertext object from parser 22. If the hypertext object is not found, parser 22 uses the CreateEntry ( ) call to create an entry (in effect, a placeholder) in server-side cache memory 30 for the new object. The new entry is returned to HTTP remote proxy 36, which requests the hypertext object from Internet 18. As a data stream for the hypertext object is returned, HTTP remote proxy 36 calls parser 22 using the PutObject ( ) call, passing into this call the new entry and the handle to the data stream to be placed into the entry. Parser 22 selects an appropriate transcode service provider 24 based, for example, on the content type of the data stream. In this context, the term content type encompasses a datatype, an HTTP MIME (Multipurpose Internet Mail Extensions) type, a content format, and so on. The selected transcode service provider 24 uses a separate thread to read the incoming data stream, transcode it, and place it within the entry of server-side cache memory 30. The current thread immediately returns to HTTP remote proxy 36, which once again calls GetScaledObject ( ) (or GetObject ( )). This case will always result in a cache hit. This thread then works simultaneously with the separate thread in the PutObject ( ) to tunnel data (either original or transcoded) from transcoding server 34 to network client 12.

Multiple-thread processing improves the efficiency of the present embodiment by not waiting for a hypertext object to be received in its entirety by HTTP remote proxy 36, or added in its entirety to server-side cache memory 30, before beginning to send the object to network client 12. Another benefit of multiple-thread processing is that parser 22 may efficiently process requests for the same hypertext object from multiple network clients 12. The hypertext object need only be retrieved from Internet 18 once, and appropriate versions may be transmitted to such multiple network clients 12 concurrently. It should be noted, however, that embodiments of the present invention may be implemented without multiple-thread processing.

As noted above, parser 22 may selectively invoke one of transcode service providers 24 based upon satisfaction of a predetermined selection criterion. Such selection criterion may comprise, for example, information contained in a header portion of a data packet received by transcoding server 34, such as a MIME type, a URL (Uniform Resource Locator), a last modified time indicator and so on. Alternatively, the predetermined selection criterion may comprise information contained in a data portion of such a data packet, such as particular content, key words, structures (for example, heading levels), and so on. Still further, the predetermined selection criterion may comprise a condition of the device on which transcoding server 34 is installed (for example, a current processing load), a condition of a device to which transcoding server 34 is coupled, or a condition of a communications link. Transcoding server 34 may provide the ability to dynamically update such predetermined selection criteria.

The following discussion provides still more examples of the types of information which may be used to dictate which of transcode service providers 24 are invoked. It should be noted, however, that these examples are provided by way of illustration only, and are not intended to limit in any way the scope of the invention claimed herein. The predetermined selection criterion may comprise: (1) network client 12, such as a display dimension, resolution, number of colors, processor type, memory/disk configuration, modem or network interface type, installed add-in boards (for example, hardware compression/decompression), software configuration (for example, availability of pre-installed software decompression modules), physical location/proximity (for example, as determined by a telephone area code), and user identity; (2) characteristics of transcoding server 34 or some other network server, including system load and identification information (for example, the owner of the server); (3) content characteristics, such as its data type, type of encoding/compression, size, and dimension; (4) network characteristics, including best-case, worst-case and average latency, bandwidth and/or error rates (for example, for wireless communications) between network client 12 and a proxy, and/or between a proxy and a server (this may be predetermined for guaranteed bandwidth links like ATM (Asynchronous Transfer Mode), or dynamically measured/predicted for so-called "best effort" links like many IP (Internet Protocol) links); (5) proxy characteristics, including system load, available storage, physical location/proximity, and identity (owner); (6) user preferences, including preferred content quality/speed tradeoff, language, content rating, exclusion list, inclusion list, data type-specific preferences (for example, "never download" images), include/exclude advertising, amount of advertising desired, offensive language removal, whether the user's defined or learned preferences may be disclosed (and to whom), custom rules or programs for filtering/transcoding/processing data, and shared preferences with either another user or a group of users (any of the foregoing user preferences may be explicitly defined or system predicated, such as based on usage statistics compiled over time); (7) group preferences, including results from collaborative rating systems, whether manual (for example, a prior user manually assigned a rating to a Web page after viewing it) or automatic (for example, given a large number of users who accessed a link on a given page, the probability of any given user subsequently following that link); (8) content provider preferences, including the degree of alteration desired for its content, the prioritization for download and display of different content types, cache restriction or prioritization parameters such as update frequency or replacement preferences, the types of users to target, rules or programs to run for customizing content (for example, news or advertising, custom language translation software) based on user or client characteristics, desire for receiving certain types of user or group data collected (for example, demographics or access patterns), and type of payment/reward offered in exchange for such information; and (9) other preferences, including software vendor rules or programs for dynamically checking content created or distributed using unauthorized software and companies' desire to enforce correct usage of certain types of content (for example, trademarks and logos).

Applying the above-listed selection criteria, or combinations thereof, embodiments of the present invention may be used to provide a virtually limitless range of dynamic transcoding services. For example, client and/or proxy physical proximity, in combination with demographic data, may be used for extremely targeted advertising. Such advertising may be added to any content passing through a proxy, for example, or some other mechanism. This can in turn be tailored even further based upon the user's willingness to tolerate advertising or share demographic information, as well as the advertiser's ability/willingness to subsidize or otherwise reward the user for participation.

Embodiments of the present invention may be advantageously used to reduce the amount of data that is transmitted to network client 12, thereby promoting faster downloading and rendering of content. Suitable transcoding techniques include lossy compression and transcoding to a more efficient (and perhaps not widely supported) format specifically for the transmission. Similarly, HTTP remote proxy 36 may be configured to "predigest" Web sites or groups of sites to produce extremely condensed overviews of large amounts of content (for example, a tree structure, pages with only first-level or first- and second-level headings, thumbnails of pages, or only parts of a page or site that have changed since the user's last visit). Such applications may be especially advantageous for poorly-connected or computationally limited devices such as PDAs (Personal Digital Assistant), since this predigestion can be performed on a well-connected proxy server with an abundance of computational power, and the concise result can be easily downloaded and rendered on the more limited device.

Embodiments of the present invention may alternatively be used for dynamic translation of data, such as Web pages, to a user's native language (determined by user preference or automatically by the physical location of network client 12 or transcoding server 34). Such a capability greatly simplifies the task of making content truly global, as well as reduces storage and maintenance required at the content provider (that is, only one copy of the content need be maintained, rather than different copies for each of a plurality of different languages).

Embodiments of the present invention may be used to block certain types of content or to automatically censor offensive language (similar to a "beep" used for television broadcasts). Only the particular offensive parts of the content (for example, obscene words) may be removed, or entire Web sites may be blocked. Similarly, transcoding server 34 may be configured to scan content for certain words or phrases to ensure that trademarks or logos are used correctly (for example, as a source identifier rather than a generic product designation). This feature may be offered as a service to companies or organizations, who would supply a list of words or phrases to flag. A similar capability could be used to automatically insert links into the content upon detection of certain words or phrases. For example, Intel Corporation might want to automatically add a link to its corporate Website whenever the name "Intel" is used in a Web page. Using an embodiment of the present invention, such links can be dynamically added to the content before it is displayed to a user. In a similar vein, an embodiment of the present invention may be used to scan for content that was created or distributed using unlicensed software. This feature may be implemented using special keys (binary bit patterns) embedded in the content or headers put in by the content creation or distribution software. The scanning logic and logic for taking a predetermined responsive action, such as denying service or posting a warning, may optionally be supplied by the vendor of the software in question or configured into transcoding server 34.

Embodiments of the present invention may also be used to scan content for computer viruses prior to sending such content to network client 12. For example, an existing virus scanning routine may be installed on transcoding server 34, possibly as a plug-in module. Transcoding server 34 may then be configured to invoke the virus scanning routine to ensure any content transmitted to network client 12 is free of viruses. A significant advantage provided by such an embodiment is that virus scanning software need only be maintained on transcoding server 34, rather than on a plurality of network clients 12. In this way, the benefit of upgrades to the virus checking software may be efficiently and timely provided to large numbers of users, thus avoiding the problem of any particular user relying on outdated virus scanning software.

Embodiments of the present invention may also be used to produce custom content on demand in accordance with user-specific preferences and/or associations with collaborative rating systems. In a variation on such an embodiment, transcoding server 34 can collect preferences and append them as part of a client request transmitted to a content provider so that the dynamic content generation can be done at the content server. Likewise, a proxy provider (for example, an Internet Service Provider (ISP)), can collect and make available to content providers information such as user preferences and data access statistics, as well as content provider specific statistics (for example, how many users from a given region or a given profile accessed a particular Web site, and at what time, in the past month). Such information may be used for applications such as targeted advertising.

Embodiments of the present invention may further be used to automatically check the validity of links in an object, and correct or remove invalid links, prior to transmitting the object to network client 12. This capability may be provided, for example, as a service to content providers who may not have the most up-to-date information on Websites they are linked to which have moved or been deleted.

To further illustrate the general operation of the embodiment illustrated in FIG. 3, assume a user of network client 12 wishes to access a particular Web page, or URL (Uniform Resource Locator), on Internet 18. Further assume that the desired URL resides on, or is accessible through, transcoding server 34. Network client 12, via browser 32, transmits an HTTP request for the hypertext object to transcoding server 34 over client/server communications link 14. Where browser 32 normally accesses Internet 18 through a proxy, browser 32 is configured to pass user requests through transcoding server 34 via browser's 32 standard proxy configuration procedures. As is well known in the art, browser 32 may actually transmit a plurality of additional HTTP requests corresponding to each of various distinct hypertext objects that may be embedded in the Web page. In such a case, transcoding server 34 may process each such request in the manner described below.

According to this embodiment, HTTP remote proxy 36 is capable of distinguishing between a non-enabled network client 12 and an enabled network client 12. This may be accomplished, for example, using a private protocol to transmit content requests from an enabled network client to transcoding server 34, so that the use of some other communications protocol indicates network client 12 is non-enabled. This method of sending a private protocol in each request to HTTP remote proxy 36 is an improvement over a registration type process. The overhead involved in making the enabled/non-enabled determination on a per request basis is relatively small, while providing a significant advantage because it addresses the situation for HTTP remote proxy 36 where a first network client disconnects and a second network client, likely with different communications and/or presentation capabilities, reconnects using the same IP address.

Upon determining that network client 12 is non-enabled, HTTP remote proxy 36 may record the IP address of network client 12 in a client preference table 26 maintained in a local data store (client preference table 26 may improve performance of this or other embodiments, but is not required). HTTP remote proxy 36 then passes the hypertext object to parser 22. HTTP remote proxy 36 may also inform parser 22 of any applicable user preferences (e.g., from client preference table 26). Upon being invoked, parser 22 first calls cache interface 28 with the requested hypertext object to determine whether a copy of the required version already resides in server-side cache memory 30. For purposes of illustration, assume no entry exists in server-side cache memory 30 for the requested hypertext object. HTTP remote proxy 36 then invokes a call to retrieve the hypertext object from Internet 18 over server/network communications link 16. Assuming the requested hypertext object is found, HTTP remote proxy 36 begins receiving an HTTP data stream representing the hypertext object. HTTP remote proxy 36 passes the handle for this incoming data stream to parser 22.

Parser 22 dynamically determines whether the data stream satisfies any applicable predetermined selection criteria. For example, where transcode service providers 24 are configured to scale data of different types, parser 22 may determine the content type for the data stream (e.g., image/jpeg, image/gif, video/mpeg) by interrogating a MIME type in the content-type header record that appears at the beginning of the incoming HTTP data stream. If parser 22 detects a match for a predetermined selection criterion, the HTTP stream handle is given to the appropriate transcode service provider 24. Transcode service provider 24 then transcodes the data stream appropriately, and HTTP remote proxy 26 transmits the transcoded data stream to network client 12.

A non-enabled network client 12 may optionally be provided with the ability to actively control aspects of the transcoding process, or indeed whether or not to transcode requested content at all. To provide this ability, HTTP remote proxy 36 may embed additional instructions at the beginning of the HTML header for the requested URL prior to transmitting the associated data stream to network client 12. These embedded instructions may be implemented, for example, as JavaScript codes, VB Script codes or Java Applet codes. As browser 32 of network client 12 receives the data stream, the embedded instructions will automatically execute so long as browser 32 is equipped to support them. For example, if the embedded instructions are implemented as JavaScript codes, browser 32 may be a JavaScript-enabled browser such as a Netscape Navigator v.2.0 or above browser, or an Internet Explorer v.3.0 or above browser. If browser 32 is not equipped for such HTML scripting, the embedded instructions will not interfere with the browser's 32 normal processing, as such browsers 32 are typically configured to ignore any data they cannot interpret.

Figure 4:
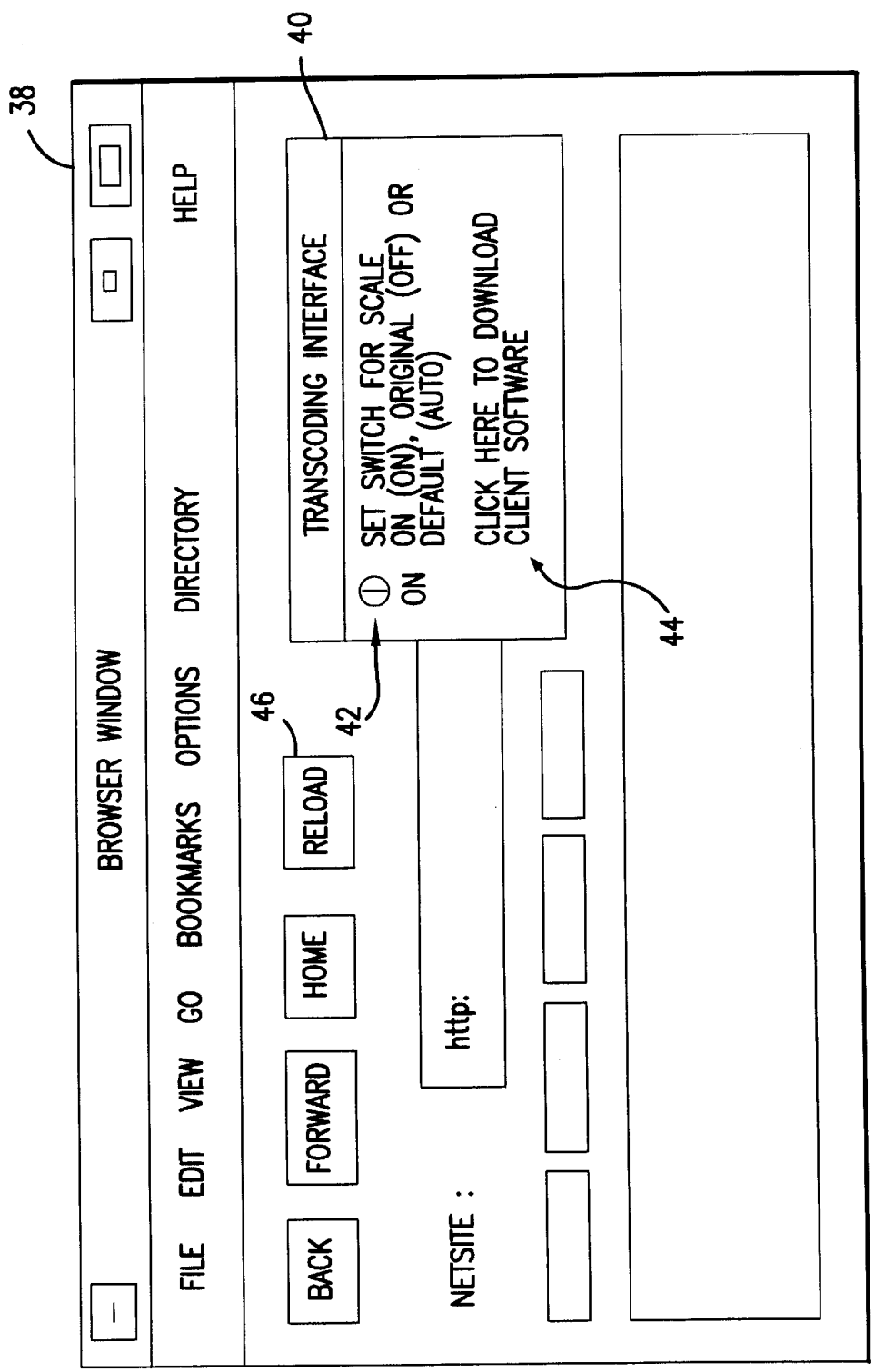
FIG. 4 is a schematic diagram illustrating an example of a user interface for providing a non-enabled network client with control over transcoding functionality.

The embedded instructions transmitted to network client 12 may enable the user to manipulate some of the transcoding capabilities of transcoding server 34. As illustrated in FIG. 4, the embedded instructions may drive a user interface in the form of a pop-up window 40 that is displayed at the top of a browser window 38. Pop-up window 40 includes a three-state switch 42 having "ON," "OFF" and "AUTO" settings, and may also include a hypertext link 44 which the user may follow to download specialized client software supporting, for example, more sophisticated transcoding functionality (i.e., become "enabled"). The initial setting of three-state switch 42 may be based upon a prior determination by HTTP remote proxy 36 as to whether network client 12 has an established preference for reception of transcoded content. If so, three-state switch 42 may be set to "ON;" if not, three-state switch 42 may be set to "OFF." A goal of this feature is to provide the user with some means for communicating a preference to HTTP remote proxy 36 with regard to aspects of particular transcoding features, such as a content quality/latency tradeoff where the transcoding comprises data compression/scaling. Persons skilled in the art will recognize that many other means for providing this capability are possible, and such other means could enable the user to. communicate preferences beyond simply a yes/no indication for transcoding.

In the illustrated in FIG. 4, pop-up window 40 enables the user to change his or her preference as to whether transcoded or original content is desired, and communicates such changes to HTTP remote proxy 36. Pop-up window 40 may or may not interact with browser 32, meaning the user's preference will only take effect after setting three-state switch 42 and clicking on the browser's 32 "RELOAD" button 46 to cause browser 32 to request the (transcoded or untranscoded) content for presentation to the user. Subsequent pages in the current session may then be rendered in accordance with the new setting of three-state switch 42 without further user intervention. Upon receipt, HTTP remote proxy 36 may update user preference table 26 accordingly. As an alternative, pop-up window 40 may be configured to automatically invoke the "RELOAD" operation when the user indicates a change (such as by flipping three-state switch 42). Where browser 32 is a JavaScript-enabled browser, JavaScript instructions inserted by HTTP remote proxy 36 in the HTML document may "POST" the state of three-state switch 42 to HTTP remote proxy 36 and also cause browser 32 to "RELOAD" the current URL.

It is possible to allow a non-enabled network client 12 to save the state of three-state switch 42 on network client 12 across multiple sessions of browser 32 using what is known in the art as a "cookie." In other words, a cookie may be used to store the state of three-state switch 42 persistently. When a new session of browser 32 is initiated by a user, this state information may be read from network client 12 and "POSTed" by the JavaScript code (inserted at the beginning of the HTML document) to HTTP remote proxy 36 before any content for the requested hypertext object is actually sent to network client 12. This will allow HTTP remote proxy 36 to update user preference table 26 with the correct state of three-state switch 42, and hence send correctly-transcoded content to network client 12. In such an embodiment, the state information may be "POSTed" to HTTP remote proxy 36 each time a given URL is requested by browser 32. This will allow network client 12 to receive the correctly-transcoded content even if the HTTP remote proxy 36 to which it is coupled changes due to, for example, a change in geographical location of network client 12 or network load-balancing procedures.

The embodiment shown in FIG. 3 may also be used for network clients 12 that already access Internet 18 through a standard proxy. JavaScript-enabled browsers 32 may query the local IP address of network client 12 and "POST" this information to HTTP remote proxy 36. The HTTP header of this "POST" message will contain the IP address of the standard proxy, which will now be different from the IP address of network client 12 (which is included in the contents of the message). A comparison of the two IP addresses will determine whether network client 12 resides behind a standard proxy. HTTP remote proxy may then use this information to update transcoding information about network client 12 in user preference table 26.

Figure 5:
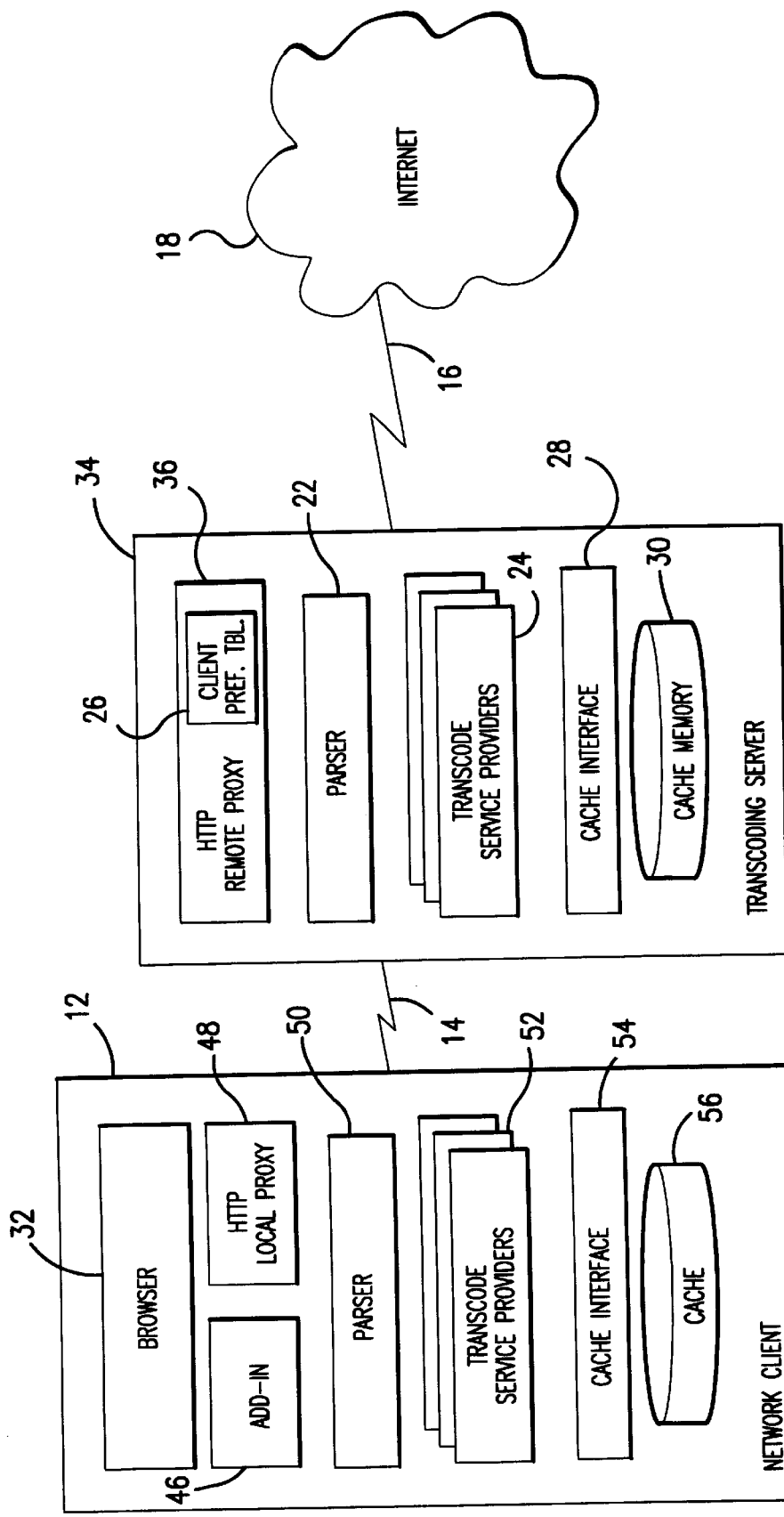
FIG. 5 is a schematic diagram illustrating an embodiment of the present invention for an enabled network client.

According to another embodiment of the present invention, illustrated in FIG. 5, network client 12 may be "enabled," containing specialized software to support, for example, more sophisticated transcoding features than are provided by the above-described embodiments, or to perform some or all of the transcoding functions on the client side. As illustrated, network client 12 includes an HTTP local proxy 48 coupled to a client-side parser 50 which, similar to parser 22 of transcoding server 34, controls one or more client-side transcode service providers 52. Each transcode service provider 52 may be configured, for example, to transcode content before it is rendered to a user or to perform a counterpart transcoding function (e.g., decoding, decompression) with respect to a function performed by a corresponding transcode service provider 24 of transcoding server 34. As in transcoding server 34, network client 12 may include a client-side cache memory 56 managed by a client-side cache interface 54. Client-side cache interface 54 may be an already-existing facility supported by the operating system, such as WININET. Using an existing caching facility reduces the amount of software that is to be downloaded to network client 12 to implement this embodiment, and also allows other applications, such as disconnected browsers, to share client-side cache memory 56.

Figure 6:
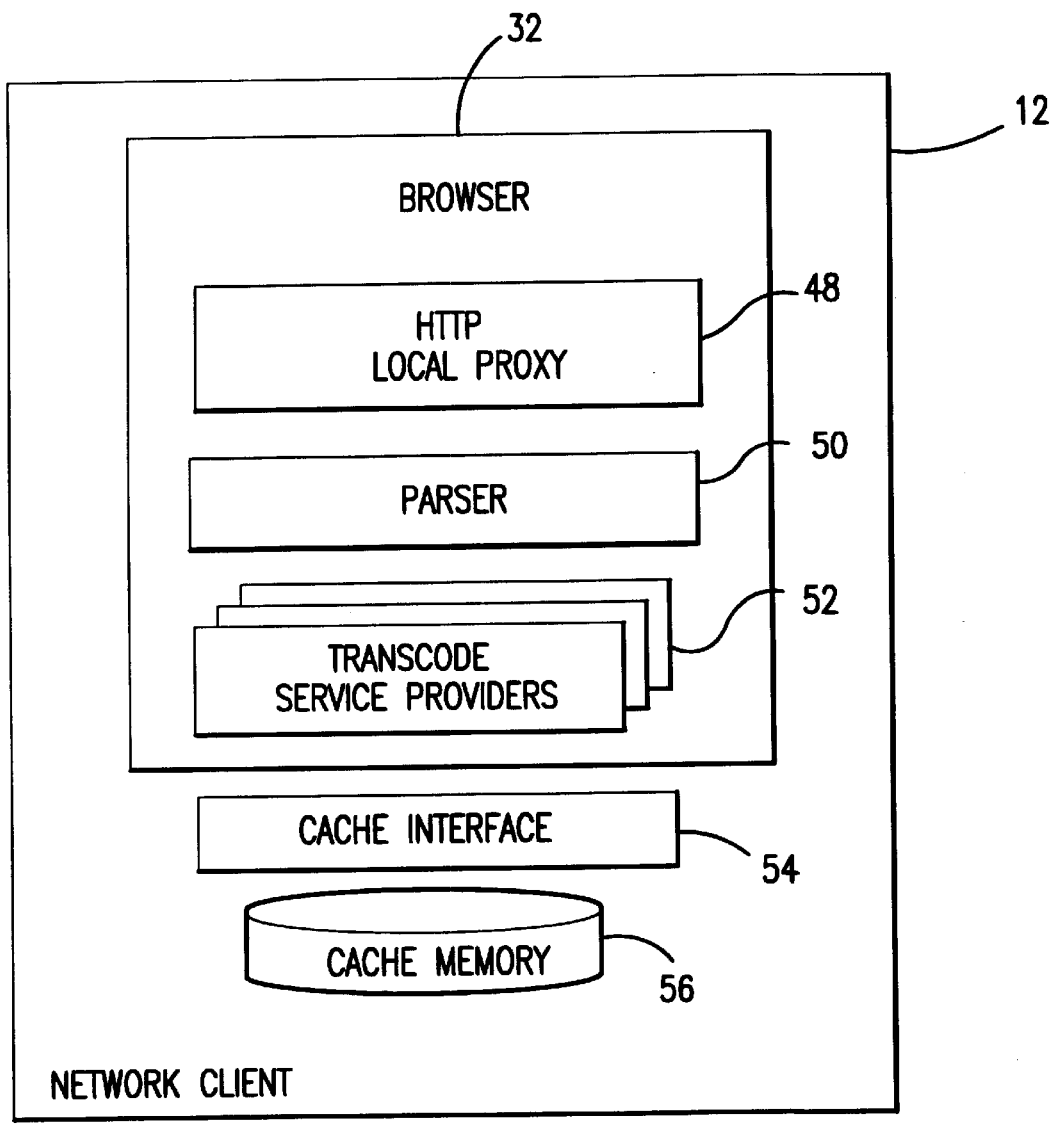
FIG. 6 is a schematic diagram illustrating a network client with transcoding functionality integrated in a browser according to an embodiment of the present invention.

HTTP local proxy 48, client-side parser 50 and client-side transcode service providers 52 (collectively, the client software) may be downloaded to network client 12 on demand, such as by clicking on hypertext link 44 presented by pop-up window 38 illustrated in FIG. 4. Alternatively, the client software could be distributed to users on a portable storage medium, such as a diskette or CD-ROM, or it may be preloaded on an off-the-shelf personal computer. In the embodiment of FIG. 5, the client software is separate from browser 32; however, in yet another embodiment the client software may be integrated in browser 32 (see FIG. 6).

The enabled client embodiments provide network client 12 with expanded flexibility for rendering hypertext objects. As in the non-enabled client embodiments described above, enabled network client 12 may receive a transcoded data stream from HTTP remote proxy 36 in a format that is already supported by the standard internal rendering software of browser 32 (e.g., JPG, GIF). This would be the case where, for example, the transcoding process involved adding or deleting text to the hypertext object. In addition, HTTP remote proxy 36 may transcode a hypertext object to a data stream having a new MIME type, such as where the transcoding process comprised scaling or data compression, in which case a clientside transcode service provider 52 could be provided to convert the data stream back to a MIME type supported by browser 32. For example, HTTP remote proxy 36 could transmit a file compressed using a non-standard, not well-supported but leading-edge compression algorithm to network client 12, and client-side transcode service provider 52 could uncompress the file back to its original format. This approach has the benefit of relieving HTTP local proxy 48 from having to provide a user interface, and eliminates restrictions imposed by limitations as to the data types supported by browser 32. In this way, the transcoding process can remain transparent to users, browsers and Web servers even when it involves changing content to different datatypes.

Yet another possibility is that enabled network client 12 includes one or more add-ins 46 specifically configured to transcode, render or playback content received by network client 12. Add-ins 46 may be implemented, for example, using Netscape plug-ins or ActiveX controls. Moreover, add-ins 46 may be installed as part of the client software, as illustrated in FIG. 5, or integrated with browser 32. Such add-ins 46 are beneficial in that they generally may be configured to permit a user to click on a specific object to obtain a different version (e.g., higher quality) representation. Add-ins 46 are also beneficial in that they appear to a user to be well-integrated with browser 32, and are easily upgradeable. Combinations of the above-described presentation facilities are also possible.

In an advantageous optional application of add-ins 46, network client 12 may be configured to request that an appropriate add-in 46 be downloaded from HTTP remote proxy 36 in the event that network client 12 determines it is unable to transcode a particular received data stream. HTTP remote proxy 36 could then download the necessary add-in 46 or, alternatively, resend the data stream in a different format. This facility provides for automatic extension of the system, ensuring that client software is as current as possible.

In the embodiment of FIG. 5, browser 32 is configured to send all HTTP requests through HTTP local proxy 48, thus allowing HTTP local proxy 48 to improve retrieval and rendering of requested hypertext objects. For example, when HTTP local proxy 48 receives an HTTP request from browser 32 for a hypertext object associated with a Web page, it passes the URL to client-side cache interface 54 to check whether a copy of the hypertext object already exists in client-side cache memory 56. If the hypertext object is cached, HTTP local proxy 48 passes the cached object to browser 32 for rendering. If the requested hypertext object is not cached, HTTP local proxy 48 transmits an HTTP request to transcoding server 34 for processing. HTTP local proxy 48 may use a custom Get ( ) request for this purpose to enable transcoding server 34 to identify network client 12 as enabled. Performing the processing described above with reference to other embodiments, transcoding server 34 will return a data stream for the hypertext object to HTTP local proxy 48.

Figure 7:
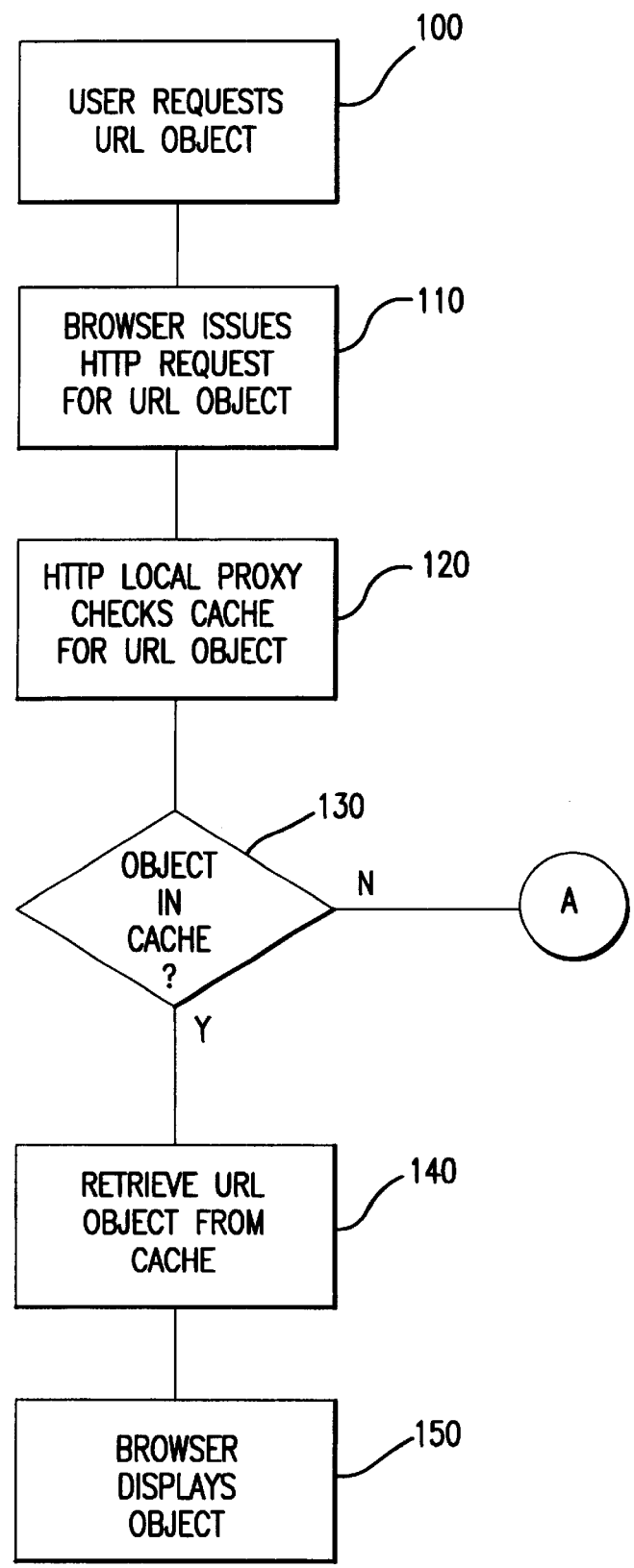
FIGS. 7–9 are flow charts illustrating logic for presenting a requested URL object to a network client according to an embodiment of the present invention.
Figure 8:
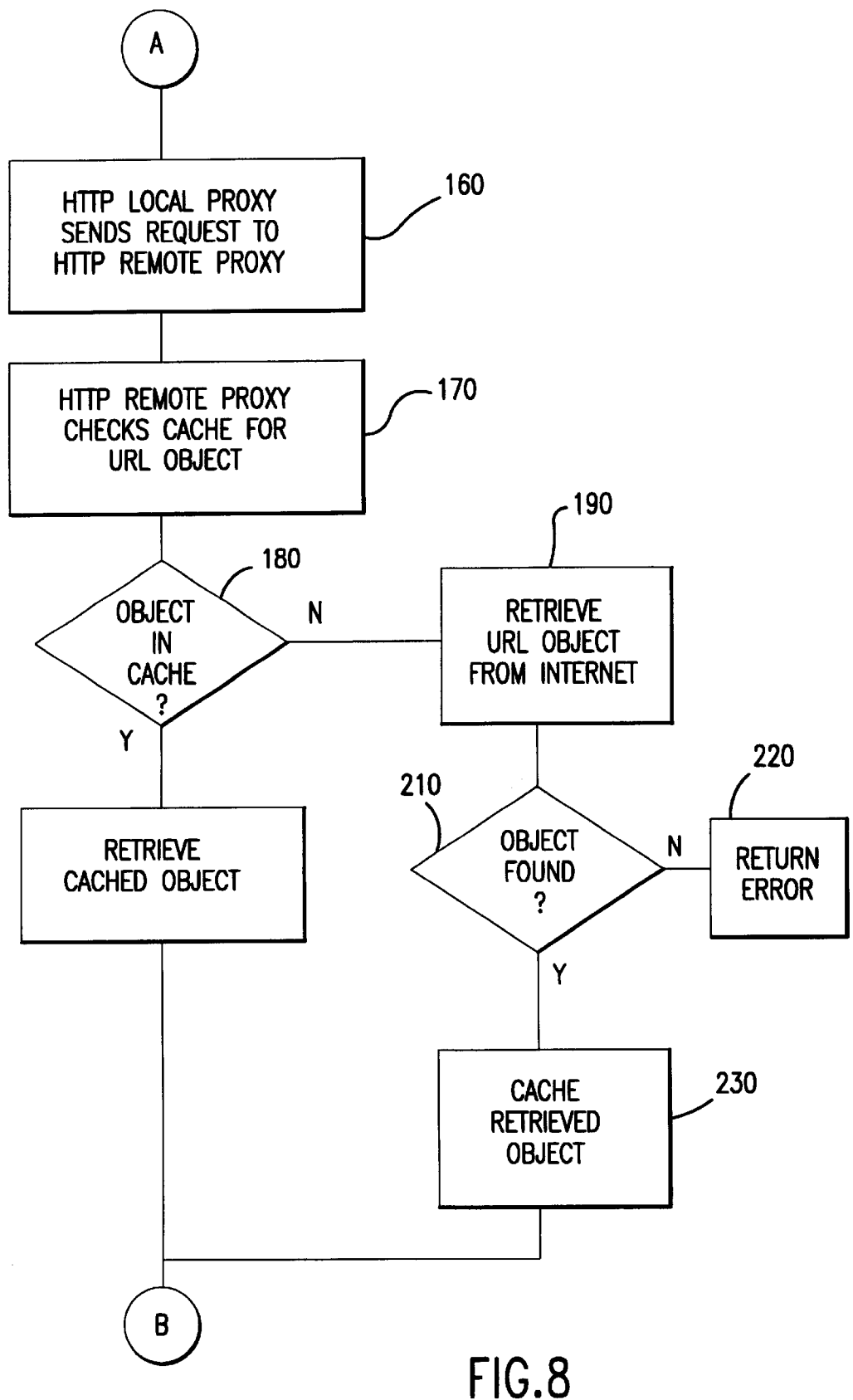
Figure 9:
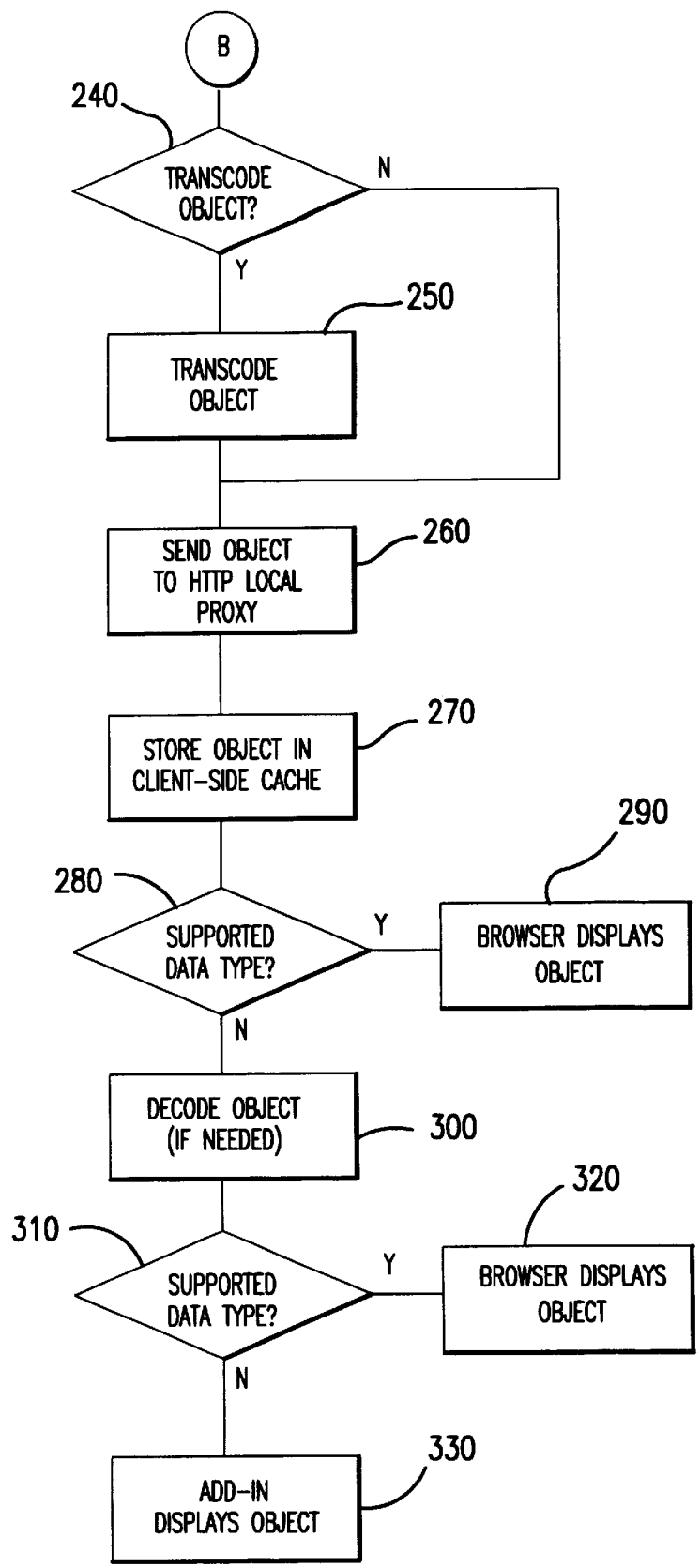

To further illustrate the features and benefits of embodiments of the present invention, the flow charts provided in FIGS. 7–9 illustrate the logic for an embodiment of a method by which an enabled network client may render a hypertext object resident on the Internet. The flow charts are not intended to be comprehensive of all processing that is performed, but rather are intended to describe the overall flow of the method. Detailed descriptions of the various processes have been provided above with reference to various disclosed embodiments. Where practical, the following description includes reference numbers for previously-described structural elements, although the method is not limited to those structures.

Referring now to FIG. 7, processing begins when a user on network client 12 requests a hypertext object from browser 32 (Step 100). This could be in the form of a request for a specific Web page, in which case a plurality of hypertext objects will likely be displayed to the user, or in the form of a click on an image already being displayed to the user. Browser 32 may be configured to pass all HTTP requests through HTTP local proxy 48, so HTTP local proxy 48 may intercept the HTTP(URL) request from browser 32 (Step 110).

In this particular embodiment, HTTP local proxy 48 first checks whether the requested hypertext object exists in client-side cache memory 56 (Step 120). To do this, HTTP local proxy 48 may invoke client-side parser 50 using a GetScaledObject(URL) call, which in turn issues a GetEntry call to client-side cache interface 54 to open a stream for the cached object. This effectively "retrieves" the cached object from client-side cache memory 56 if it exists (Step 140). HTTP local proxy 48 then passes the stream to browser 32, which displays the cached object to the user (Step 150).

Referring now to FIG. 8, if the requested URL object is not found in client-side cache memory 56, HTTP local proxy 48 transmits a request for the object to transcoding server 34 using, for example, a Post of a GetStage(URL, Stage=0) call (Step 160). Upon receipt of this call, HTTP remote proxy 36 invokes parser 22, which in turn issues a GetScaledObject [00bf] [00a8] call to server-side cache interface 28 to determine whether a non-transcoded version of the requested hypertext object already exists in the server-side cache memory 30 (Step 170). If the hypertext object is cached, server-side cache interface 28 issues a GetEntry call to open a stream for the cached object (Step 200). In addition, parser 22 may issue a GetProperties(URL, . . . ) call to server-side cache interface 28 to retrieve information about the transcoding properties and transcoded status (such as the refinement level) of the cached object.

If parser 22 determines that the requested hypertext object does not exist in the server-side cache memory 30, HTTP remote proxy 36 issues an HTTP request to retrieve the hypertext object from Internet 18 (Step 190). If the object is not found, HTTP remote proxy 36 returns an error to network client 12 which browser 32 will communicate to the user (Step 220); if the object is found, HTTP remote proxy 36 passes the handle for the incoming data stream to parser 22, which in turn initiates caching of an original version of the retrieved hypertext object (Step 230).

Referring now to FIG. 9, once the requested hypertext object has started to be obtained, parser 22 determines whether (and how) to transcode the object before transmitting it to network client 12 (Step 240). Both this decision-making process and exemplary transcoding processes are described in detail above. For purposes of the present illustration, assume parser 22 determined that transcoding was appropriate and therefore generated a transcoded version of the requested hypertext object (Step 250). HTTP remote proxy 36 transmits a data stream for the transcoded hypertext object to network client 12 (Step 260). Upon receipt, HTTP local proxy 48 initiates caching of the transcoded hypertext object (Step 270). In addition, client-side parser 50 determines whether any further processing is required before the hypertext object is rendered (e.g., a new MIME type has been established by transcoding server 34) (Step 280).

If no additional transcoding is required, HTTP local proxy 48 passes the handle for the received data stream to browser 32 for display to the user (Step 290). If additional transcoding is required, client-side parser 50 passes the handle to an appropriate transcode service provider 52 (Step 300). The result of this latter processing may be a hypertext object which browser 32 can readily display to the user (Step 320), or the result may be a hypertext object having a non-standard MIME type, in which case browser 32 may invoke add-in 46 to display the object (Step 330).

According to another embodiment of the present invention, additional data or programs need not necessarily be inserted as part of a response to a client request. Rather, data and programs may be transparently "pushed" to network client 12 without the user or the browser 32 software's detection or intervention. One advantage of this approach is that transcoding server 34 is able to detect when client/server communications link 14 is underutilized, and can thus push data to network client 12 with limited risk of interfering with other transactions. An especially advantageous implementation uses at least a local proxy, which could issue its own requests (rather than being user-driven) to content providers or networked proxy servers, or receive unsolicited data pushed to it from the network. The local proxy may store the data in a client-side cache, install it as a program, or prompt the user to take some further action. Many potential uses for such an embodiment are possible. For example, an advertiser of software products or music can preload network client 12 with trial versions of products before prompting the user with an advertisement, thus enabling instant playback capability without the user having to wait for a demo to be downloaded (and possibly losing interest in the meantime).

A number of different configurations are possible for implementing embodiments of the present invention. In a first configuration, the only additional apparatus required is a remote proxy. That is, no new software needs to be installed on network client 12. The remote proxy may reside anywhere on a suitable network, such as the Internet, including at particular content provider sites. Alternatively, the remote proxy may be located at ISP local POPs (Point of Presence), for example, if location-specific characteristics are to be used as predetermined selection criteria. Of course, such information can be gathered by other methods as well, such as user preference settings or assigning location-specific domain names to proxies. In a second configuration, a new piece of client software acting as a local proxy may be installed, for example, on a client device. The user would then point the client application's proxy to the local host. Combinations of these exemplary configurations are likewise possible, as well as simultaneously having multiple modes active (for example, a local proxy acting as a pass-through for some requests and a non-pass-through for others that require the use of a remote proxy).

Where network client 12 connects to a remote proxy over a relatively slow communications link, it may be particularly advantageous to implement transcoding and link validity checking on remote proxies. Combinations of remote and local proxies can sometimes give more efficient implementations of certain applications, such as automatic data/program download and interactively displaying predigested content. Other applications, such as translation and trademark enforcement, can be done efficiently on local proxies alone, but may be more advantageously done on remote proxies because the results can be cached for use by others, thereby saving resources for future requests. Still other applications, such as clickstream analysis, are generally better implemented on a local proxy because there are more resources available locally to the individual user, and also for privacy reasons.

In view of the foregoing description, it should be apparent that it is possible for there to be more than one so-called "smart" proxy arranged between a client device and a content server device. If left unchecked, such a condition can result in content being altered excessively (for example, too many ads inserted, multiple lossy compressions resulting in indecipherable images). To address this problem, an embodiment of the present invention may use a special proxy-to-proxy protocol that extends the existing request/response structures to indicate whether and what sort of transcoding has already been performed on the content. Such a specialized protocol, in addition to other proxy-to-proxy messages which may be implemented on an as-needed basis, enables multiple proxies to work collaboratively, yet still transparently to users, client software, existing "standard" proxies and content servers.

According to yet another embodiment of the present invention, a proxy server may be used to provide certain Internet proxy or server users with so-called "VIP" treatment, identifying users who are entitled (either through payment or based on some other selection criterion, such as extent of usage) to have a higher priority when competing with other users for proxy resources. By contrast, with existing Internet proxies and servers, users are serviced either on a random or first-come/first-served basis.

In one particular implementation of such an embodiment, transcoding server 34 may be configured to extract user IP addresses from requests it processes and maintain information such as how frequently, or for what duration, a user is browsing a particular Web site. Such information could be used to determine "frequent browser miles" at particular Web sites. Users can then be rewarded with faster response times for subsequent visits to the site, or the site owner could choose to reward the user with improved performance on all sites reached through the same proxy. Still another possibility is that users may pay for such preferred service, being assigned a password which may be provided to transcoding server 34. Yet another possibility is that a Web site owner can pay a proxy provider to improve the performance of all users while visiting the owner's site.

In another particular implementation, information identifying users to be given VIP treatment may be passed to transcoding server 34 in the form of a Web page. Upon receipt of such a Web page, the proxy may subsequently allow servicing threads to perform work for requests generated by VIP users first. To do this, transcoding server 34 may boost thread scheduling priorities (within the operating system) for the VIP service, while ensuring there is no starvation of any thread (that is, no user should be denied access entirely by VIP users). In addition, transcoding server 34 may permit preferential caching for particular Web sites and more aggressive pre-fetching for VIP users. Still further, transcoding server 34 may use more resource-intensive compression algorithms, for example, to provide better quality content for the same latency at the expense of slowing down access for nonVIP users.

It is possible that certain content providers or users will not wish to have their content dynamically altered in any manner. Accordingly, embodiments of the present invention may be implemented in such a way that either content providers or users are given the capability to override any potentially content-altering service. This may be accomplished, for example, using a pass-through technique triggered by a special tag embedded within the content.

As the foregoing description demonstrates, embodiments of the present invention may be used to provide a system for improving the communications capabilities of computers accessing networks such as the Internet. Embodiments of the invention may be advantageously applied to computers having limited communications bandwidth available, such as mobile computers or personal computers accessing a network over a modem connection. The unique features of such embodiments enhance the ability of these computers to access data on the network in a timely fashion with reduced user-visible latencies, thereby enabling content authors to produce rich content without fear that only users with highly-sophisticated data communications and display capabilities are able to enjoy it. Embodiments of the present invention may also be advantageously used for purposes other than, or in addition to, reducing latency. Such purposes include, for example, converting color images to greyscale images for users lacking a color display; filtering and/or deleting undesired content, such as pornography; adding content, such as advertising; and language translation.

Although the present invention has been described with reference to embodiments for accessing data from the Internet, persons skilled in the art will recognize that it is equally applicable to other networking environments. For example, embodiments of the present invention may be used to enhance data communications between a network client computer and an "intranet." An intranet typically is a secure corporate network modeled after the Internet architecture, and generally includes mechanisms for communicating with external networks such as the Internet.

The foregoing is a detailed description of particular embodiments of the present invention. The invention embraces all alternatives, modifications and variations that fall within the letter and spirit of the claims, as well as all equivalents of the claimed subject matter. For example, some or all of the features described above as being provided by a remote proxy may be implemented in a content server. Likewise, some or all of the features described above as being provided by a local proxy may be implemented in a browser application. Persons skilled in the art will recognize from the foregoing detailed description that many other alternatives, modifications and variations are possible.

What is claimed is:

1. A method for providing a network client with a data object residing on a network server, said method comprising:

receiving a request for a data object from the network client;

retrieving the requested data object from the network server;

determining whether the data object includes content created with an unauthorized software product, said determination comprising scanning the data object for a predetermined code associated with an authorized software product;

selectively transcoding the data object according to a predetermined selection criterion in response to said determination; and providing the transcoded data object to the network client.

2. The method of claim 1, wherein said step of selectively transcoding the data object further comprises adding a message to the data object corresponding to said detection of content created with an unauthorized software product.

3. A method for providing a network client with a data object residing on a network server, said method comprising:

receiving a request for a data object from the network client;

retrieving the requested data object from the network server;

determining whether the data object includes textual content meeting a predetermined selection criterion, said determination comprising scanning the data object for text written in a specified language;

selectively transcoding the data object in response to said determination; and providing the transcoded data object to the network client.

4. The method of claim 3, wherein said step of selectively transcoding the data object comprises translating text written in the specified language to a different language.

* * * * *